US006472771B1

United States Patent
Frese et al.

(10) Patent No.: US 6,472,771 B1
(45) Date of Patent: Oct. 29, 2002

(54) MOTOR VEHICLE HAVING A VEHICLE ELECTRONICS SYSTEM, INTERFACE FOR THE VEHICLE ELECTRONICS SYSTEM AND A METHOD FOR OPERATING THE VEHICLE ELECTRONICS SYSTEM

(75) Inventors: Thomas Frese, Gehrden; Richard Aumayer, Diekholzen; Hans-Joerg Mathony, Tamm-Hohenstange, all of (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 09/629,303

(22) Filed: Jul. 31, 2000

(30) Foreign Application Priority Data

Jul. 30, 1999 (DE) .......................................... 199 35 893

(51) Int. Cl.⁷ .............................. H05K 5/00; G05B 9/03
(52) U.S. Cl. ...................... 307/10.1; 361/686; 307/9.1; 701/36
(58) Field of Search .................. 361/686, 683, 361/679, 682; 307/9.1, 10.1; 340/310.01; 701/36, 49

(56) References Cited

U.S. PATENT DOCUMENTS

| | | | | |
|---|---|---|---|---|
| 5,745,027 A | * | 4/1998 | Malville ................ 340/310.01 |
| 5,850,209 A | * | 12/1998 | Lemke et al. ................ 345/156 |
| 6,032,089 A | * | 2/2000 | Buckley ...................... 701/36 |
| 6,107,917 A | * | 8/2000 | Carrender et al. .......... 340/505 |
| 6,118,441 A | * | 9/2000 | Kobayashi et al. ......... 345/326 |
| 6,317,668 B1 | * | 1/2001 | Thibault ...................... 701/35 |
| 6,229,434 B1 | * | 5/2001 | Knapp et al. .......... 340/310.01 |
| 6,236,918 B1 | * | 5/2001 | Sonoda et al. ................ 701/36 |
| 6,272,469 B1 | * | 8/2001 | Koritzinsky et al. ........... 705/2 |
| 6,289,332 B2 | * | 9/2001 | Menig et al. .................. 707/1 |
| 6,330,499 B1 | * | 12/2001 | Chou et al. .................... 701/33 |

FOREIGN PATENT DOCUMENTS

FR          829394 A1 * 3/1998 ........... B60R/16/02

* cited by examiner

*Primary Examiner*—Lynn D. Feild
*Assistant Examiner*—David Foster
(74) *Attorney, Agent, or Firm*—Kenyon & Kenyon

(57) ABSTRACT

A motor vehicle has a vehicle electronics system. The vehicle electronics system has a personal computer interface for connecting the vehicle electronics system to a personal computer.

38 Claims, 1 Drawing Sheet

US 6,472,771 B1

MOTOR VEHICLE HAVING A VEHICLE ELECTRONICS SYSTEM, INTERFACE FOR THE VEHICLE ELECTRONICS SYSTEM AND A METHOD FOR OPERATING THE VEHICLE ELECTRONICS SYSTEM

FIELD OF THE INVENTION

The present invention relates to a motor vehicle having a vehicle electronics system. The present invention also relates to an interface for a vehicle electronics system of a motor vehicle. The present invention further relates to a method for operating a vehicle electronics system of a motor vehicle.

BACKGROUND INFORMATION

With the arrival of personal computers (PCs) in private households, there are now also proposals to provide a computer, called a car PC, in a motor vehicle. These car PCs are designed to be installed in a DIN compartment for a car radio and to include the functionality of a car radio or extensive functions that are generally described as driver information systems (FIS functions), such as the function of a navigation device or Global System for Mobile Communications(GSM) telephone. In this manner, the various FIS functions, combined in a single device (car PC), are accessible via a single joint user interface. However, such car PCs lie in a high price category and are only usable for the special purpose for which they are designed. Universal applicability, as is the case with conventional personal computers (PC), is out of the question in the case of car PCs.

SUMMARY OF THE INVENTION

It is an object of the present invention is to improve a motor vehicle, an interface and a method of the aforesaid type to the effect that ease of operation and functionality are improved without at the same time having to develop special, cost-intensive computer design approaches.

The above and other beneficial objects of the present invention are most effectively attained by providing a motor vehicle with an electronics system that includes an interface for connecting the electronics system with a personal computer. The personal computer (PC) is connected to the vehicle electronics system so that a vehicle user can operate the vehicle electronics system from the PC and/or can operate the PC from a user interface of the vehicle electronics system. That is, the respective functionalities of the vehicle electronics system and the PC are made available reciprocally.

One advantage of the present invention is that a link may be established between conventional PC technology, particularly the hardware and software commercially available, and vehicle technology, whereby the PC is able to obtain vehicle data and, conversely, the vehicle technology obtains access to up-to-date hardware and software, so that the functionality of the PC and/or the motor vehicle is increased. The integration of the PC into the motor vehicle gives the PC access to vehicle functions such as vehicle data, diagnostics, on-board computer, and gives a computing device integrated, for example, in the dashboard and having a user interface such as an operating element, a display, or the like, access to the PC having the up-to-date hardware and software of the connected PC that are provided by the respective vehicle user. PC technology with respect to hardware and software, already existing or developed in the future, is fully usable immediately in the motor vehicle. All innovations in PC and communications technology in the field of hardware and software can also be implemented immediately in the vehicle without intervention in the vehicle. A cost advantage is thus achieved in comparison to the permanently installed car PC, and synchronization or compatibility problems between the office/home PC and the car PC are avoided. New and individual functions, the scope of which the vehicle user himself can determine, are constantly able to be implemented in the motor vehicle. This is achieved by a specific connection of the vehicle electronics system to the newest PC technology, both with regard to hardware and to software. Special PC software for PCs integrated according to the invention into the motor vehicle brings a new market for software manufacturers.

According to one aspect of the present invention, the personal computer (PC) is a mobile or portable PC such as, for example, a notebook PC, a sub-notebook PC, a palmtop PC, a personal digital assistance (PDA) or a laptop PC.

In one embodiment, the vehicle electronics system has a first user interface with a first display device, the PC interface of the vehicle electronics system being designed so that, in addition to the motor-vehicle functions, the PC is also operable via the first user interface of the vehicle electronics system, and a screen output of the PC is effected via the first display device of the user interface of the vehicle electronics system, PC functions also being accessible from the first user interface of the vehicle electronics system. Furthermore, the PC has a second user interface with a second display device, the PC interface of the vehicle electronics system being designed in such a way that, in addition to PC functions, motor-vehicle functions are also operable via the second user interface of the PC, and a screen output is effected via the second display device of the PC. In this context, the screen output of the PC is preferably effected both via the first display device of the vehicle electronics system and via the second display device of the PC.

For example, the motor vehicle has a vehicle PC (VPC) with a display device and an operating element, the PC interface being constructed on the VPC. To prevent unauthorized access to the VPC via, for example, a mobile radiocommunication link connected to the PC, a firewall is integrated in the VPC.

To connect the PC in a simple and functionally reliable manner, provision is made between the PC interface of the vehicle electronics system and the PC for a docking station, into which the PC can be releasably inserted for the connection to the vehicle electronics system.

For example, the PC interface is a plug-in connection or a wireless connection.

In addition, a connection of the PC to a power supply of the vehicle electronics system is provided for the energy supply of the PC in the motor vehicle.

For example, the vehicle electronics system includes various control units, such as the engine control unit, transmission control unit, drive train control unit, vehicle electrical system control unit, door control unit, a car radio and/or a driver information system, a mobile radiocommunication unit or mobile cellular phone, a diagnostic tool, vehicle data sensors and/or vehicle environment sensors, a communications device (vehicle-vehicle or vehicle-infrastructure) for the exchange of data, e.g., automatic toll collection, access authorization, a heating/air-conditioning system with corresponding control units, an instrument cluster designed, for example, as a freely programmable display, one or more displays and/or a GPS navigation device. This vehicle can likewise be provided with devices which derive settings for various control units from maps or navigational data. In addition, the PC and/or the vehicle electronics system has at least one communication interface, in particular GSM (Global System for Mobile Communications), GPS (Global Positioning System), DVB (Digital Video Broadcasting) or DAB (Digital Audio Broadcasting).

DETAILED DESCRIPTION

Figure 1:
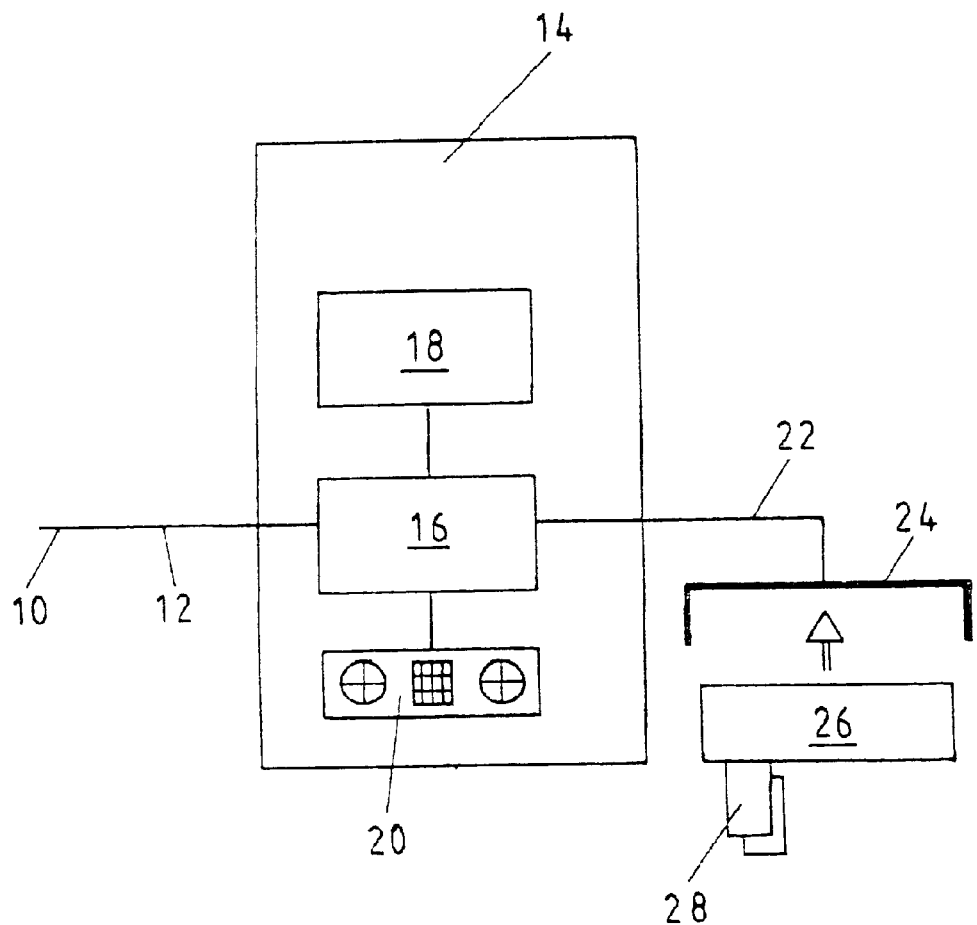
FIG. 1 shows a schematic block diagram of one embodiment of a connection according to the present invention between a vehicle electronics system and a personal computer (PC).

As shown in FIG. 1, a vehicle electronics system 10 is connected via an interface 12, e.g., a controller-area network (CAN), to a vehicle PC (VPC) 14. VPC 14 includes a computing device 16, a display device 18 and an operating element 20, and, for example, is installed, possibly with further operating control elements, in a central console. The vehicle electronics system, otherwise not shown in greater detail, includes, in particular, an air-conditioning system, an engine management, an instrument cluster, and the like. A docking station 24 is connected to computing device 16 via a personal computer interface (PC interface) 22. Docking station 24 is used to accommodate a conventional personal computer (PC) 26 such as a notebook computer, so that this PC 26 is connected via docking station 24 to computing device 16 and, therefore, to vehicle electronics system 10.

Thus, PC interface 22 permits the connection of an external PC 26 to VPC 14, it being possible to operate external PC 26 via operating element 20, and the PC output being displayed via display device 18 of VPC 14. PC 26 thus expands vehicle electronics system 10.

PC 26 has a PC card interface 28, for example, according to the PCMCIA standard, for connecting communications components such as GSM (Global System for Mobile Communications), GPS (Global Positioning System) or DAB (Digital Audio Broadcasting), which are then additionally available via VPC 14. A firewall that protects vehicle electronics system 10 from external unauthorized access, e.g., via the GSM, is preferably integrated in VPC 14.

The combination of VPC 14 and external PC 26, with access to corresponding vehicle-electronics components via interface 22, is able, for example, to cover the functions specified in Table 1.

| Field | Function | Partition of the Function (Example) |
| --- | --- | --- |
| Body electronics | Operation and control of air-conditioning system, window lifters, outside mirror, seat adjustment, etc. | VPC |
| Vehicle protection | Car alarm, emergency call (automatic, manual) | PC, GSM Communication |
| Driver information | On-board computer | Integral component of VPC |
| Vehicle diagnostics | System diagnostics, SG diagnostics | PC |
|  | Remote diagnostics | PC, GSM Communication |
| Personal information | Personal profile | VPC |
|  | Appointments book, address filing system, notes, office functions | PC |
| Entertainment | Radio, CD player, DAB | VPC |
|  | Video, digital video broadcasting(DVB) | PC |
|  | Computer games | PC |
| Communication | GSM-Handy, Internet, fax, E-mail | PC, GSM Communication |
| Navigation | Route planning | PC |
|  | Guidance system | VPC |
| Services | Fleet management | PC |
|  | Traffic information | PC, GSM Communication |
|  | Vehicle locating and shutdown | PC, GSM communication, GPS communication |
|  | Travel information (points of interest) | PC, GSM communication, GPS communication |

Table 1: VPC/PC Functions

In Table 1, column 3 describes one possible distribution (partition) of functions between the VPC and the PC. It is essential that VPC 14 remain fully functional, even when external PC 26 is undocked and permit a vehicle user access via an appropriate user interface to the functions integrated in the VPC and connected devices. Those functions that are only possible in conjunction with external PC 26, such as route planning, are automatically available via the user interface of VPC 14 after PC 26 has been docked. For example, provision is made on VPC 14 for a key by which the vehicle user can switch into a PC mode, so that operating element 20 and display device 18 of VPC 14 become an operating element and a display device for external PC 26. In this case, for example, a graphic user interface (GUI) such as a windowing interface appears on display device 18 in the central console of the motor vehicle. External PC 26 can then be remotely operated by-appropriate operating elements 20 of VPC 14.

Alternatively, external PC 26 is connected by a device similar to docking station 24, or by a standardized interface (serial interface) via a plug connector or in a wireless, e.g., infrared, manner. The interface connection to the vehicle electronics system can also be effected directly with the aid of a suitable interface such as CAN, without computing device 16. In this case, the communication with the outside world is performed either via communication interfaces (GSM, GPS, DVB, DAB, etc.) connected to or integrated in PC 26, or via communication interfaces (GSM, GPS, DVB, DAB, etc.) connectible to or integrated in the vehicle, or in a combination of communication interfaces of PC 26 and the vehicle. If communication components are implemented in PC 26, then they are preferably connected to a vehicle antenna, so that transmitting/receiving capacity possibly in the vehicle is boosted.

New functions such as a driver's log or diagnostics, which are really only created by the connection to the vehicle electronics system, are possible on external PC 26. A separation between vehicle-specific data that can or should be utilized by the vehicle owner, and data that should only be accessible for authorized groups such as vehicle manufacturers, suppliers, the garage, etc., can be implemented in a simple manner. In doing this, only the PC interfacce of the present invention must be provided in the vehicle. In this context, the scope of the data provided by the vehicle can vary as a function of the vehicle equipment. The vehicle has no disadvantages whatsoever in its basic functionality, since this is fulfilled even when external PC 26 is not connected. The utilization depends solely on the vehicle user. Furthermore, new or individual functions, the scope of which is determinable by the vehicle user and which are achieved by the connection in each case to the newest PC technology (hardware and/or software), can constantly be implemented in the vehicle.

Furthermore, the present invention also allows an expandable functionality of vehicles that have no VPC 14. A vehicle user does not have to decide immediately upon purchase of the vehicle whether he wants VPC functionality, since he can "retrofit" this later himself by the simple connection of an external PC 26.

External PC 26 is preferably connected to a power supply of the vehicle, such as, for example, the car battery. Data input to vehicle electronics system 10 and data output from vehicle electronics system 10 are possible via PC 26. It is possible to implement additional functions such as accident recorder, diagnostics, driver's log or the adjustment of the vehicle to individual characteristics such as body size for the seat setting, limitation of the highest possible speed, etc. The access and/or utilization authorization like, for example, restricted utilization region only within the national boundaries, in a scope definable by the vehicle owner such as the car-rental firm or car-sharing company, can be implemented by suitable software installed on PC 26.

The data input/output can also be effected by speech, for example, with the aid of devices existing on PC 26, or with the assistance of devices existing in the vehicle such as loudspeaker, microphone, and speech preparation for PC interface 22. A combination of such devices of PC 26 and the vehicle is also possible.

What is claimed is:

1. A motor vehicle, comprising:
   a vehicle electronics system, the vehicle electronics system including a personal computer interface configured to connect a personal computer to the vehicle electronics system, wherein the vehicle electronics system includes a first user interface and a first display device, functions of the motor vehicle being operable via the first user interface, the personal computer interface being configured so that a screen output of the personal computer is effected via the first display device, functions of the personal computer being accessible from the first user interface.

2. The motor vehicle according to claim 1, wherein the personal computer comprises one of a notebook computer, a sub-notebook computer, a palmtop computer, a personal digital assistant and a laptop computer.

3. The motor vehicle according to claim 1, wherein the personal computer has a second user interface and a second display device, functions of the personal computer being operable via the second user interface, the personal computer interface being configured so that functions of the motor vehicle are operable via the second user interface and so that a screen output is effected via the second display device.

4. The motor vehicle according to claim 3, wherein the screen output of the personal computer is effected via the first display device and the second display device.

5. The motor vehicle according to claim 1, further comprising a vehicle personal computer having a display device and an operating element, the personal computer interface being constructed on the vehicle personal computer.

6. The motor vehicle according to claim 5, wherein the vehicle personal computer includes a firewall.

7. The motor vehicle according to claim 1, wherein the personal computer interface includes a docking station into which the personal computer is releasably insertable.

8. The motor vehicle according to claim 1, wherein the personal computer interface includes a plug-in connection.

9. The motor vehicle according to claim 1, wherein the personal computer interface includes a wireless connection.

10. The motor vehicle according to claim 1, further comprising a connection connecting the personal computer and a power supply of the motor vehicle.

11. The motor vehicle according to claim 1, wherein the vehicle electronics system includes at least one of an engine control unit, a transmission control unit, a drive train control unit, a vehicle electrical system control unit, a door control unit, a car radio, a driver information system, a mobile radiocommunication unit, a mobile cellular phone, a diagnostic tool, at least one vehicle data sensor, at least one vehicle environment sensor, a vehicle-to-vehicle communications device, a vehicle-infrastructure communications device, an automatic toll collection device, an access authorization device, a heating/air-conditioning system, an instrument cluster, at least one display, and a navigation device.

12. The motor vehicle according to claim 11, wherein the instrument cluster includes a programmable display.

13. The motor vehicle according to claim 12, wherein the heating/air-conditioning system includes at least one associated control unit.

14. The motor vehicle according to claim 1, wherein at least one of the personal computer and the vehicle electronics system includes at least one communications interface.

15. The motor vehicle according to claim 14, wherein each communications interface is one of a Global System for Mobile Communications system, a Global Positioning System, a Digital Video Broadcasting system and a Digital Audio Broadcasting system.

16. An interface for an electronics system of a motor vehicle, wherein the interface is a personal computer interface configured so that a personal computer is connectable to the electronics system, wherein the vehicle electronics system includes a first user interface and a first display device, functions of the motor vehicle being operable via the first user interface, the interface being configured so that the personal computer is operable via the first user interface and so that a screen output of the personal computer is effected via the first display device, functions of the personal computer-being accessible from the first user interface.

17. The interface according to claim 16, wherein the personal computer comprises one of a notebook computer, a sub-notebook computer, a palmtop computer, a personal digital assistant and a laptop computer.

18. The interface according to claim 16, wherein the personal computer has a second user interface and a second display device, functions of the personal computer being operable via the second user interface, the interface being configured so that functions of the motor vehicle are operable via the second user interface and so that a screen output is effected via the second display device.

19. The interface according to claim 18, wherein the screen output of the personal computer is effected via the first display device and the second display device.

20. The interface according to claim 16, wherein the motor vehicle includes a vehicle personal computer having a display device and an operating element, the interface being constructed on the vehicle personal computer.

21. The interface according to claim 20, wherein the vehicle personal computer includes a firewall.

22. The interface according to claim 16, further comprising a docking station into which the personal computer is releasably insertable.

23. The interface according to claim 16, further comprising a plug-in connection.

24. The interface according to claim 16, further comprising a wireless connection.

25. The interface according to claim 16, further comprising a connection for connecting the personal computer to a power supply of the motor vehicle.

26. The interface according to claim 16, wherein the vehicle electronics system includes at least one of an engine control unit, a car radio, a mobile radiocommunication unit, a diagnostic tool, at least one vehicle data sensor, an instrument cluster and a global positioning system navigation device.

27. The interface according to claim 16, wherein at least one of the personal computer and the vehicle electronics system includes at least one communications interface.

28. The interface according to claim 27, wherein each communications interface is one of a Global System for Mobile Communications, a Global Positioning System, a Digital Video Broadcasting system and a Digital Audio Broadcasting system.

29. A method for operating an electronics system of a motor vehicle, comprising the step of:

connecting a personal computer to the vehicle electronics system so that the vehicle electronics system is operable by a user via the personal computer and so that the personal computer is operable by a user via a user interface of the vehicle electronics system, respective functionalities of the vehicle electronics system and the personal computer being reciprocally available.

30. The method according to claim 29, wherein the personal computer comprises one of a notebook computer, a sub-notebook computer, a palmtop computer, a personal digital assistant and a laptop computer.

31. The method according to claim 29, wherein motor vehicle functions are operable via a first user interface of the vehicle electronics system, the personal computer being operable via the first user interface, a screen output of the personal computer being routed to a first display device of the first user interface, the personal computer being operable via the first user interface.

32. The method according to claim 31, wherein personal computer functions are operable via a second user interface of the personal computer, motor vehicle functions being operable via the second user interface, a screen output being routed to a second display device of the personal computer.

33. The method according to claim 32, wherein the screen output of the personal computer is routed to the first display device and the second display device.

34. The method according to claim 29, wherein the personal computer is releasably connectible to the vehicle electronics system via a docking station.

35. The method according to claim 29, further comprising the step of connecting the personal computer to a power supply of the motor vehicle.

36. The method according to claim 29, wherein the vehicle electronics system includes at least one of an engine control unit, a car radio, a mobile radiocommunication unit, diagnostic tool, at least one vehicle sensor, an air-conditioning system, an instrument cluster and a global positioning system navigation device.

37. The method according to claim 29, wherein at least one of the personal computer and the vehicle electronics system includes at least one communication interface.

38. The method according to claim 37, wherein each of the communications interfaces includes one of a Global System for Mobile Communications system, a Global Positioning System, a Digital Video Broadcasting system and a Digital Audio Broadcasting system.

\* \* \* \* \*